(12) United States Patent
Finlay et al.

(10) Patent No.: US 10,773,802 B2
(45) Date of Patent: Sep. 15, 2020

(54) TILT-ROTOR VERTICAL TAKEOFF AND LANDING AIRCRAFT

(71) Applicant: Forward Robotics Inc., Kitchener (CA)

(72) Inventors: Tamara Jean Finlay, Toronto (CA); Meng Wei, Toronto (CA)

(73) Assignee: Forward Robotics Inc, Kitchener (CA)

( * ) Notice: Subject to any disclaimer, the term of this patent is extended or adjusted under 35 U.S.C. 154(b) by 261 days.

(21) Appl. No.: 16/016,797

(22) Filed: Jun. 25, 2018

(65) Prior Publication Data

US 2018/0370629 A1 Dec. 27, 2018

Related U.S. Application Data

(60) Provisional application No. 62/525,297, filed on Jun. 27, 2017.

(51) Int. Cl.
*B64C 39/02* (2006.01)
*B64C 29/00* (2006.01)

(52) U.S. Cl.
CPC ........ *B64C 39/024* (2013.01); *B64C 29/0033* (2013.01); *B64C 2201/021* (2013.01); *B64C 2201/024* (2013.01); *B64C 2201/027* (2013.01); *B64C 2201/104* (2013.01); *B64C 2201/108* (2013.01); *B64C 2201/126* (2013.01); *B64C 2201/145* (2013.01); *B64C 2201/165* (2013.01)

(58) Field of Classification Search
CPC .............. B64C 39/024; B64C 29/0033; B64C 2201/021; B64C 2201/024; B64C 2201/027; B64C 2201/104; B64C 2201/108; B64C 2201/126; B64C 2201/165

See application file for complete search history.

(56) References Cited

U.S. PATENT DOCUMENTS

| | | | | |
|---|---|---|---|---|
| 7,472,863 | B2* | 1/2009 | Pak ........................ | A63H 27/14 244/12.5 |
| 2003/0062443 | A1* | 4/2003 | Wagner ..................... | B64C 3/56 244/12.3 |
| 2003/0080242 | A1* | 5/2003 | Kawai ..................... | F02K 3/025 244/12.4 |
| 2012/0261523 | A1* | 10/2012 | Shaw ...................... | B64C 27/28 244/7 R |

\* cited by examiner

*Primary Examiner* — Justin M Benedik
(74) *Attorney, Agent, or Firm* — K&L Gates LLP

(57) ABSTRACT

The present disclosure provides an aircraft system in the tilt-rotor category with four propulsion units where the tilt angle and thrust of each unit is controlled independently of the other units. The tilt angle for each unit can be adjusted anywhere from below horizontal, to fully forward, and to greater than 180 degrees (i.e. tilted backwards). As a result, the system enables greater control during all phases of flight. Due to continuous, independent tilt control of the angle and thrust of each rotor, the present aircraft can avoid stalls much easier than traditional fixed-wing aircraft and other VTOL designs, as thrust vectors can at any moment be adjusted to compensate for loss of wing lift, making the aircraft safer to use.

20 Claims, 6 Drawing Sheets

TILT-ROTOR VERTICAL TAKEOFF AND LANDING AIRCRAFT

CROSS-REFERENCE TO RELATED APPLICATIONS

This application incorporates by reference and claims the benefit of priority to U.S. Provisional Patent Application No. 62/525,297 filed Jun. 27, 2017.

BACKGROUND OF THE INVENTION

The present subject matter relates generally to vertical takeoff and landing (VTOL) technologies with quad independent and continuous-tilt rotors, and blended wing-body aircraft for use as an unmanned aerial vehicle (UAV).

UAV is a powerful aircraft that manipulates aerodynamic forces to provide lift without an onboard human operator. Generally, UAVs can be flown autonomously or piloted remotely, can be expendable or recoverable, and can be enabled to carry payloads.

VTOL is an aircraft that is subject to particular movement conditions including the abilities to vertically takeoff and land from a static position at ground level. VTOL aircrafts can hover in place and perform translational and rotational maneuvers while airborne. Additionally, VTOL aircraft can have the ability to transition between movement phases including vertical takeoff, hover, translational and rotational movement, and vertical landing. VTOL aircraft are advantageous because a smaller area is needed for takeoff and landing than conventional runway takeoff type aircraft. However, the transitions between movement phases of VTOL aircraft while airborne are known to create moment forces and other adverse aerial forces that cause disruptions to the stability of the VTOL aircraft.

Much research has been done to the UAV and VTOL technology to simplify the combined mechanical and control design to reduce the complexity and risk of failure while maintaining stability. It has been known to utilize multiple rotors to provide an improvement to vehicle balance and stability while in use. These vehicles must overcome stability issues relating to adverse moment forces caused by the environment as well as gyroscopic moment forces due to movement conditions and transitioning phases that are generated during aircraft maneuvers.

VTOL technology theoretically enables increased mobility and versatility compared to traditional fixed-wing aircraft. However, the most common VTOL designs, rotorcraft such as helicopters and quadcopters, generally have lower range and endurance compared to a fixed-wing aircraft due to active generation of lift. Existing VTOL designs which incorporate fixed-wing elements, and hence have better range and endurance compared to rotorcraft, tend to fall into 3 categories: quad-plane, tail-sitter, and tilt-rotor. However, such existing designs have instability problems and control difficulties, which decrease the versatility of the aircraft.

Quad-planes, also known as separate lift and thrust (SLT), consist of a fixed-wing design with forward propulsion unit(s), with separate vertical thrust units (usually 4) for VTOL capabilities. The quad-plane in flight has a transition zone where lift is transferred between active generation by the vertical thrusters and passive generation by the wings, as airspeed changes based on varying the thrust provided by the forward propulsion unit(s). During this transition zone, aerodynamic instabilities can occur as air separates and reattaches over the wing surfaces. The quad-plane typically has two control regimes: hover and forward flight, with the transition zone in between. In hover, the quad-plane stabilizes its position by varying thrust on the vertical units and varying the attitude of the aircraft to point the vertical units in various directions. However, due to the relatively large surface area of the wings, this design becomes unable to hold position in high winds, and in order to move forward, the aircraft must pitch down causing negative lift on the wings; or carefully vary the forward thrust while maintaining a positive pitch angle, however, this method does not react fast enough to stabilize the aircraft in gusting wind conditions. In order to move laterally, the aircraft must roll causing increased exposure of the wing area to crosswinds, which can cause the aircraft to become roll-unstable. Moreover, deceleration while maintaining a constant altitude is extremely difficult to control because the aircraft must pitch up so that the vertical units point backwards, and this increases the angle of attack of the wing, thereby increasing lift, followed by stall as the aircraft slows down. Finally, quad-planes control yaw rotation in hover by using differences in torque between the vertical thrusters, driven at different RPMs, which requires a large amount of thrust overhead as yawing torque is equal to rotor drag. During windy conditions, the amount of additional thrust required to maintain heading can easily overwhelm the available thrust and lead to instabilities.

The tail-sitter typically has one or multiple forward-facing propulsion units when the aircraft is in forward flight, and VTOL is achieved by pitching up to 90 degrees such that the same propulsion unit(s) are used to hover. As a result, the aircraft takes off and lands on its "tail" end. Similar to the quad-plane, such designs also have a transition zone between two control regimes. This introduces similar instabilities, difficulties in maintaining position in hover mode during high winds, and it is almost impossible to maintain altitude during the transition regions.

Conventional tilt-rotors use rotor thrust to control roll and pitch, along with optionally using differential tilt angle to control yaw, yielding greater controllability over other designs. However, most existing tilt-rotor systems transition between discrete hover and forward flight modes of operation, in which the rotors are tilted to fixed angles, and not coupled with attitude and position control. Discrete modes of operation prevent these systems from transitioning seamlessly between different airspeed regimes, and reduce translational controllability. Decoupled tilt and attitude control also allows the existing designs to be susceptible to the same stall and spin risks as conventional aircraft in the forward flight mode.

Accordingly, there is a need for a VTOL design that is capable of stable transition zones and avoids the disadvantages of traditional fixed-wing aircraft. There is a need to provide a VTOL UAV system that reduces undesired moment force phenomena generated by aircraft maneuvers to increase flight effectiveness, versatility, and efficiency while maintaining flight stability.

BRIEF SUMMARY OF THE INVENTION

The present disclosure provides a system in the tilt-rotor category, but has 4 propulsion units where the tilt angle and thrust of each unit is controlled independently of the other units. The tilt angle for each unit can be adjusted anywhere from below horizontal, to fully horizontal, and to greater than 90 degrees (i.e. tilted backwards). As a result, the system enables greater control during all phases of flight. The system does not have an unstable transition zone because any tilt angle in this range (e.g. 80 to 280°, where 0° is pointed downward) is allowed, such that the transition is seamless between active and passive lift. Moreover, the aircraft can maintain attitude and altitude while varying forward airspeed from positive to zero to negative (i.e. moving backwards) due to the use of varying tilt angles and thrust magnitudes. In addition, superior yaw control over most existing VTOL designs is achieved due to the use of differential tilt, in addition to differential thrust. Due to continuous, independent tilt control the angle and thrust of each rotor, the present aircraft can avoid stalls much easier than traditional fixed-wing aircraft and other VTOL designs, as thrust vectors can at any moment be adjusted to compensate for loss of wing lift, making the aircraft safer to use.

An advantage of the present system is the continuous and independently controlled rotor tilting system.

A further advantage of the present system is that the aircraft does not require or rely on vertical stabilizers, thereby reducing drag, due to active yaw control in all flight modes by differential thrust.

The system can include a single main wing in between front and back rotors and connecting near the center of the fuselage, instead of two (tandem) wings (e.g., V-44 quad tilt-rotor). The aircraft's vertical takeoff capabilities can make low speed aerodynamic flight unnecessary, and the blended wing body geometry has been optimized for high speed and subsonic cruise flight.

The system can include a pair of navigation cameras at the front of the fuselage, typically one on each side, which are used for collision avoidance. Further, rotors can be incorporated to the respective booms/struts as opposed to wing tips. As a result, the main wing can have a larger wing span than otherwise possible because it does not have to support large bending moments from rotor thrusts at the wing tips. Rotors boom/struts can extend out from the fuselage in the lateral direction, or extend out from the wing in the longitudinal direction. Extending out from the fuselage allows the possibility of up to 360 degree range of tilt angles about the lateral axis to primarily control longitudinal translation of the aircraft, as it is not limited by rotor blades colliding with boom, which can severely limit control robustness. Similarly, extending out from the wing allows possibility of up to 360 degrees range of tilt angles about the longitudinal axis to primarily control lateral translation of the aircraft.

In addition, the system can include a fuselage lateral cross section designed to resemble a positively-cambered airfoil, combined with the fuselage's top outline form a wing-like body that can generate lift when the VTOL and hovering is in the presence of lateral wind. The fuselage's airfoil-like cross section, when combined with elimination of vertical stabilizers minimizes lateral drag, which increases lateral stability when hovering in lateral wind.

In an example, the system for controlling a quad tilt vertical takeoff and landing unmanned aerial vehicle includes a fuselage body including a front end region, a back end region, a first side region, and a second side region, wherein a horizontal geometric plane separates a top portion of the fuselage body and a bottom portion of the fuselage body; a first front rotor connected to the front end region and the first side region of the fuselage body; a second front rotor connected to the front end region and the second side region of the fuselage body; a first rear rotor connected to the back end region and the first side region of the fuselage body; a second rear rotor connected to the back end region and the second side region of the fuselage body, wherein each rotor is connected to a tilting mechanism, wherein each tiling mechanism includes a pivotable mechanism connected to the fuselage via a horizontal boom, wherein each tilting mechanism is configured to manipulate a tilting angle of each rotor about a horizontal axis from zero degrees to 360 degrees, wherein the horizontal axis is perpendicular to a fuselage longitudinal axis, wherein the fuselage longitudinal axis extends from the front end region to the back end region of the fuselage, wherein when the rotor is in a 0 degree tilting angle the plane containing the propellers is coplanar with the horizontal geometric plane of the fuselage, wherein when the rotor is in a 90 degree tilting angle the plane containing the propellers is perpendicular to the horizontal geometric plane of the fuselage, wherein when the rotor is in a 180 degree tilting angle the plane of the propellers is coplanar with the horizontal geometric plane of the fuselage; and a controller in communication with each rotor, wherein the controller is configured to manipulate the speed of rotation of the propellers of each rotor independently, wherein the controller is configured to manipulate the tilting angle of each rotor independently.

In an example, the system for controlling a quad tilt vertical takeoff and landing unmanned aerial vehicle includes a fuselage body including a front end region, a back end region, a first side region, and a second side region, wherein a horizontal geometric plane separates a top portion of the fuselage body and a bottom portion of the fuselage body; a first side wing extending from the first side of the fuselage body; a second side wing extending from the second side of the fuselage body; a first front rotor connected to a front edge of the first side wing via a first longitudinal boom; a second front rotor connected to a front edge of the second side wing via a second longitudinal boom; a first rear rotor connected to the first side region of the back end region and of the fuselage body via a first horizontal boom; a second rear rotor connected to the second side region of the back end region and of the fuselage body via a second horizontal boom, wherein the first front rotor and the second front rotor are connected to a tilting mechanism configured to manipulate a tilting angle of each rotor about a rotor longitudinal axis from zero degrees to 360 degrees, wherein the rotor longitudinal axis is parallel to a fuselage longitudinal axis, wherein the fuselage longitudinal axis extends from the front end region to the back end region of the fuselage, wherein when the first front rotor and the second front rotor are in a 0 degree tilting angle the plane containing the propellers is coplanar with the horizontal geometric plane of the fuselage, wherein when the first rear rotor and the second rear rotor are in a 90 degree tilting angle the plane containing the propellers is perpendicular to the horizontal geometric plane of the fuselage, wherein when the first rear rotor and the second rear rotor are in a 180 degree tilting angle the plane of the propellers is coplanar with the horizontal geometric plane of the fuselage, wherein the first rear rotor and the second rear rotor are connected to a tilting mechanism configured to manipulate a tilting angle of each rotor about a horizontal axis from zero degrees to 360 degrees, wherein the horizontal axis is perpendicular to a fuselage longitudinal axis, wherein the longitudinal axis extends from the front end region to the back end region of the fuselage, wherein when the first rear rotor and the second rear rotor are in a 0° tilting angle the plane containing the propellers is coplanar with the horizontal geometric plane of the fuselage, wherein when the first rear rotor and the second rear rotor are in a 90 degree tilting angle the plane containing the propellers is perpendicular to the horizontal geometric plane of the fuselage, wherein when the first rear rotor and the second rear rotor are in a 180 degree tilting angle the plane of the propellers is coplanar with the horizontal geometric plane of the fuselage; and a controller in communication with each rotor, wherein the controller is configured to manipulate the speed of rotation of the propellers of each rotor independently, wherein the controller is configured to manipulate the tilting angle of each rotor independently.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1A:
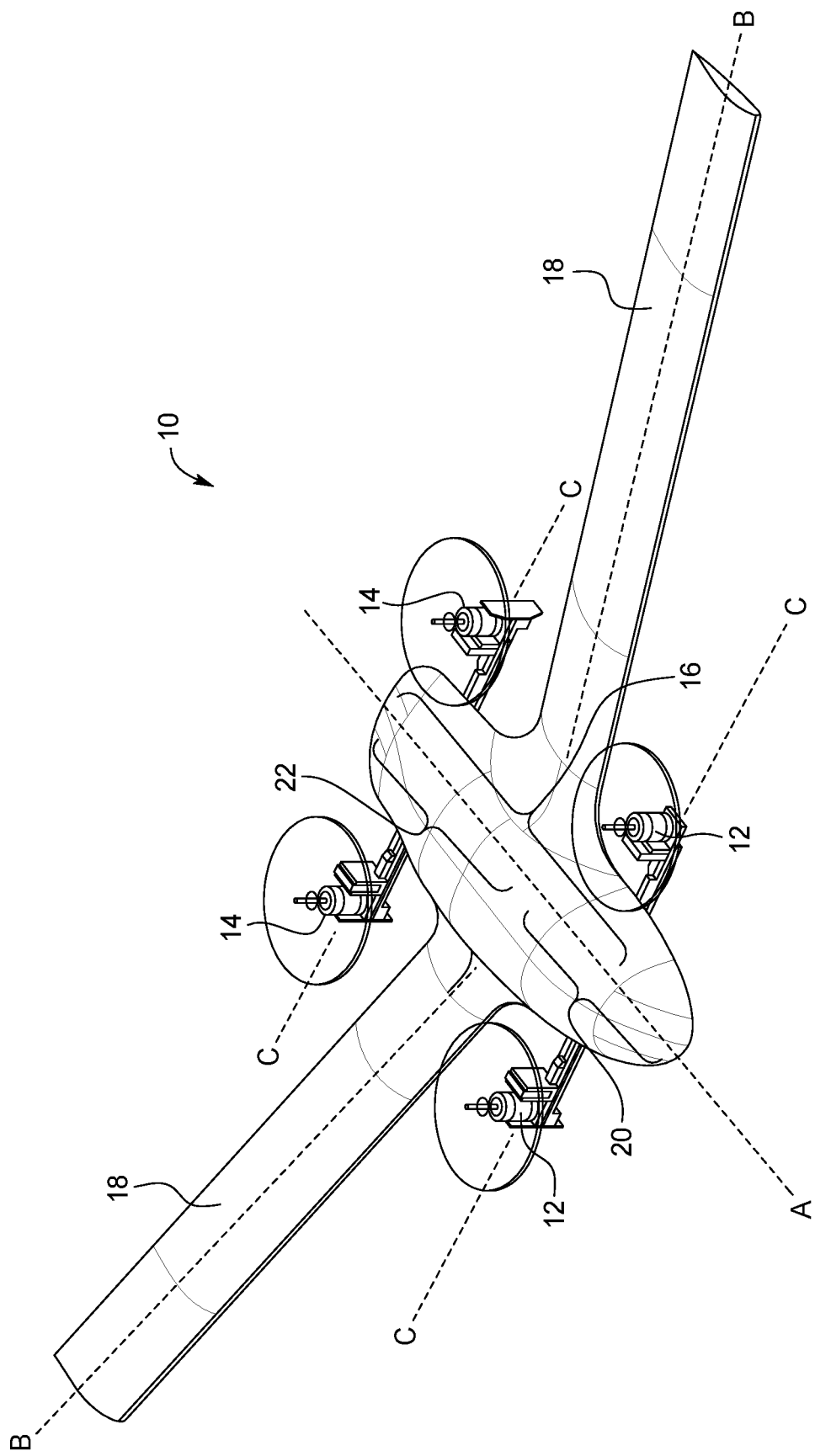
FIGS. 1A-1B are perspective views of examples of the present aircraft system.

The present aircraft system 10 can be a VTOL blended wing-body UAV (drone) with four independent tilt rotors 12, 14 (the aircraft). A system and method are provided to control stability of quad tilt-rotors in a vertical takeoff and landing (VTOL) unmanned aerial vehicle (UAV) by independently controlling the rotational speed of propellers at each rotor while simultaneously controlling the tilt angle of each of the rotors.

The aircraft 10 can include a central fuselage 16. The fuselage 16 may be any shape. In an example, the fuselage includes a fuselage longitudinal central axis A, with a front end 20 of the fuselage and a back end 22 of the fuselage 16. The aircraft 10 can include a pair of wings 18 (or one continuous wing), with fuselage 16 and wings 18 integrated such that there is no clear dividing line between the two (i.e. a blended wing-body configuration). The aircraft 10 can be any suitable size. In an example, the system 10 includes a length of approximately 0.5-5 m (e.g., 0.5-4 m, 1-3 m) and wingspan of approximately 1-5 m (e.g., 1-4 m, 2-4 m). The fuselage 16 and wings 18 can be made from a combination of carbon fiber and 3D-printed plastic parts. Although, any suitable material is contemplated. For example, any type of lightweight material that is sturdy enough to provide a rigid body and sufficient for use. The aircraft can be composed of a mixture of metal, composite, and/or plastic components.

The four tilting rotors 12, 14 can be located on the aircraft in such an arrangement as to surround the center of gravity of the aircraft, e.g. two front rotors 12 in front of the wings 18 and two rotors 14 behind the wing 18 on both left and right side of the fuselage. The tilting rotors 12, 14 can be controlled independently and continuously over the entire tilting range (i.e. no fixed tilt angle positions for flight modes).

Figure 2:
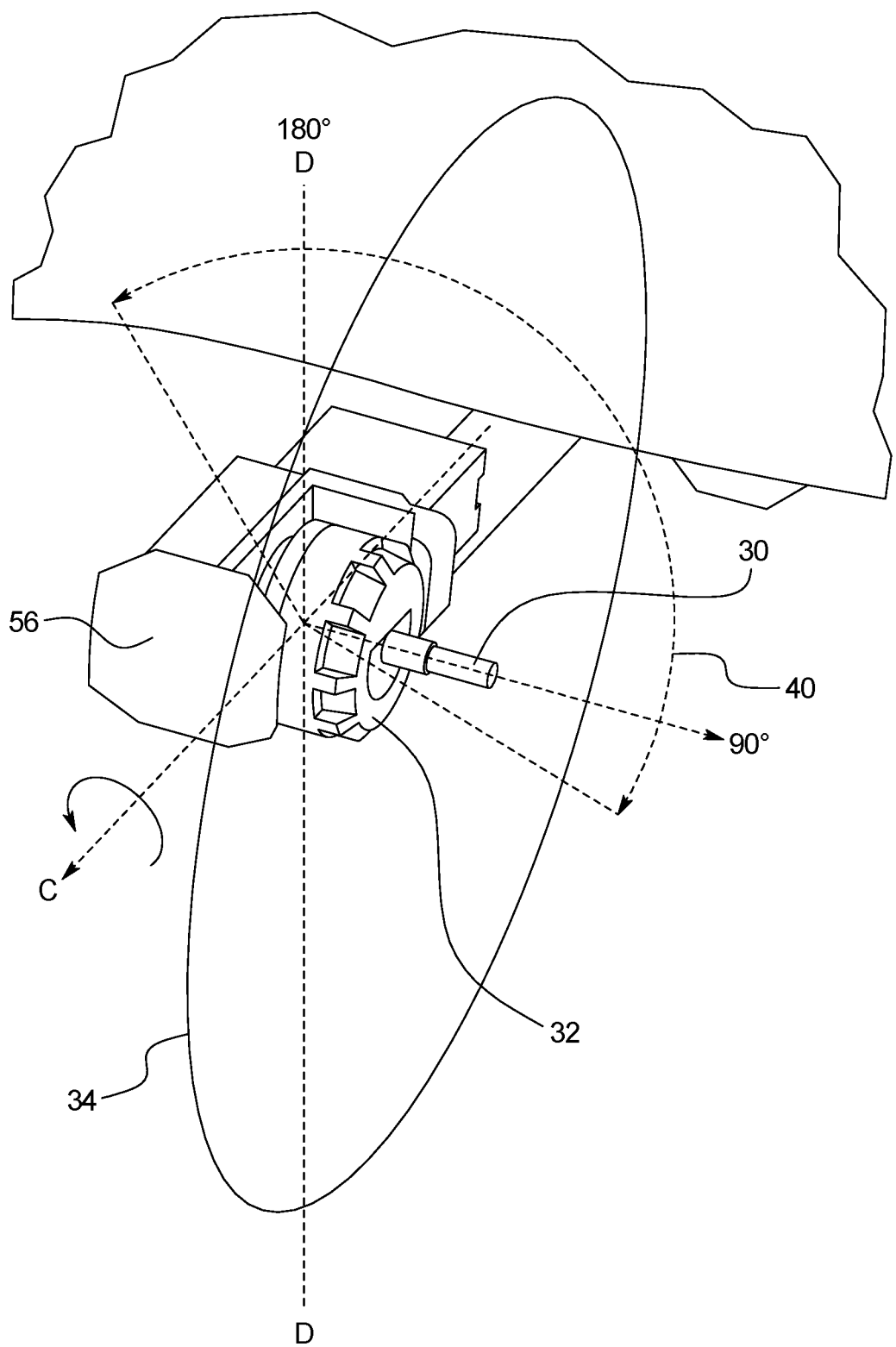
FIG. 2 is a perspective view of an example of the tilting capabilities of a rotor of the aircraft system.
Figure 3:
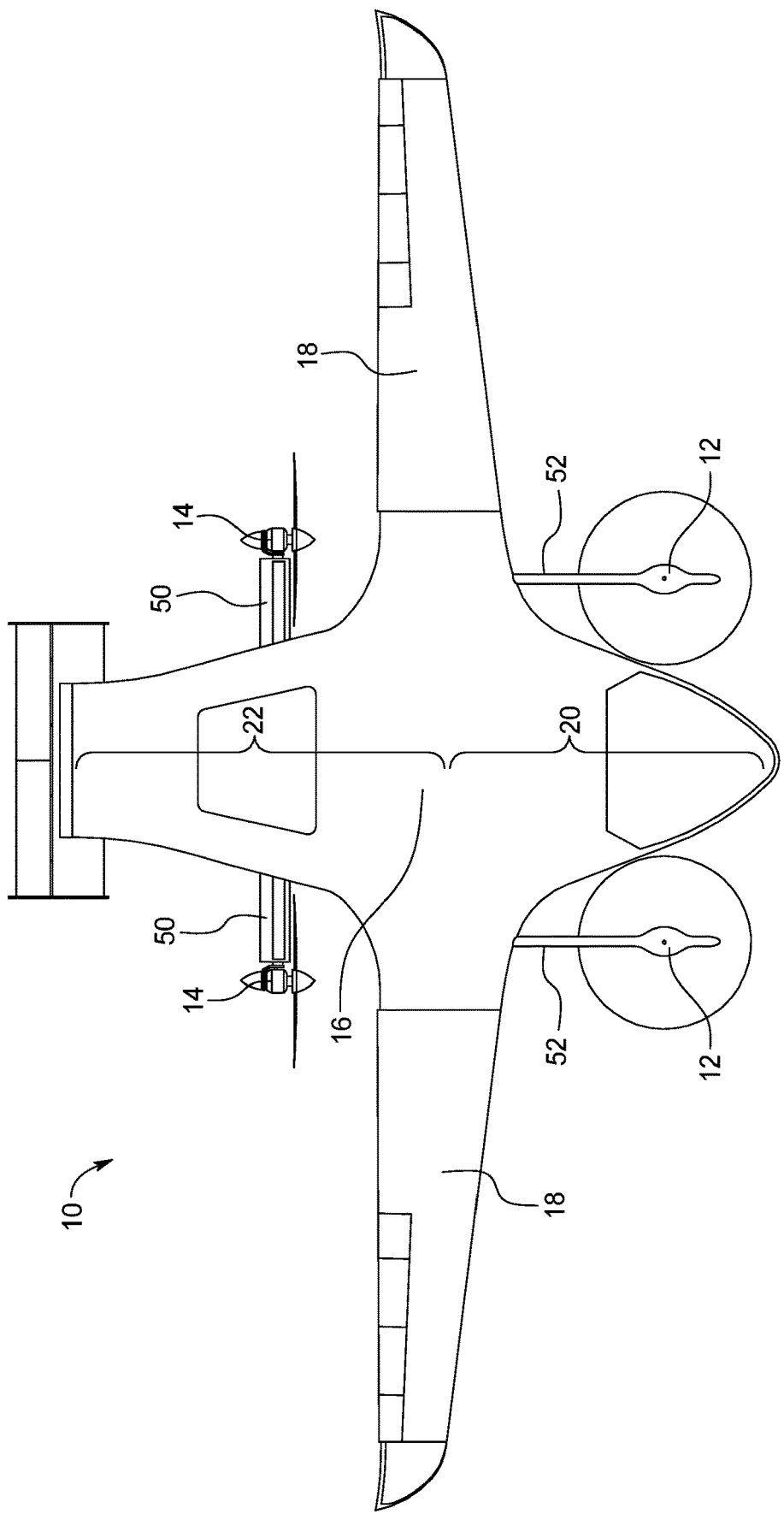
FIG. 3 is a top view of an example of the aircraft system.

As shown in FIG. 2, the tilting rotors 12, 14 include a rotatable axis 30 that is attached to a tilting mechanism 32 configured to have independently controllable tilt angles 40. The rotatable axis 30 is perpendicular to the geometric plane containing the propellers of the rotor. The tilting range can be greater than 0° to 180° (e.g. 80° to 210°, −50° to 50°) relative to a vertical axis. For example, for the rotors connected to the fuselage 16 via the horizontal booms 50, 0° refers to the rotatable axis 30 pointing downward (perpendicular to a geometric horizontal plane containing the fuselage body 16 and wings 18), 90° refers to when the rotatable axis 30 is pointed forward (parallel to the longitudinal fuselage axis A), and 180° refers to the rotational axis 30 pointing directly upward (perpendicular to a geometric horizontal plane containing the fuselage body).

As shown in FIG. 1A, the front rotors 12 and back rotors 14 can be attached to the fuselage 16 through two horizontal booms 50 located in front and/or behind the wing and attached to the fuselage 16, wherein horizontal booms 50 extend substantially perpendicular to the fuselage longitudinal axis A, and/or substantially parallel with the horizontal axis B of the wings 18. In such configuration, the rotatable axis 30 of each rotor can rotate about a horizontal axis C, wherein horizontal axis C is perpendicular to the fuselage longitudinal axis A.

Figure 1B:
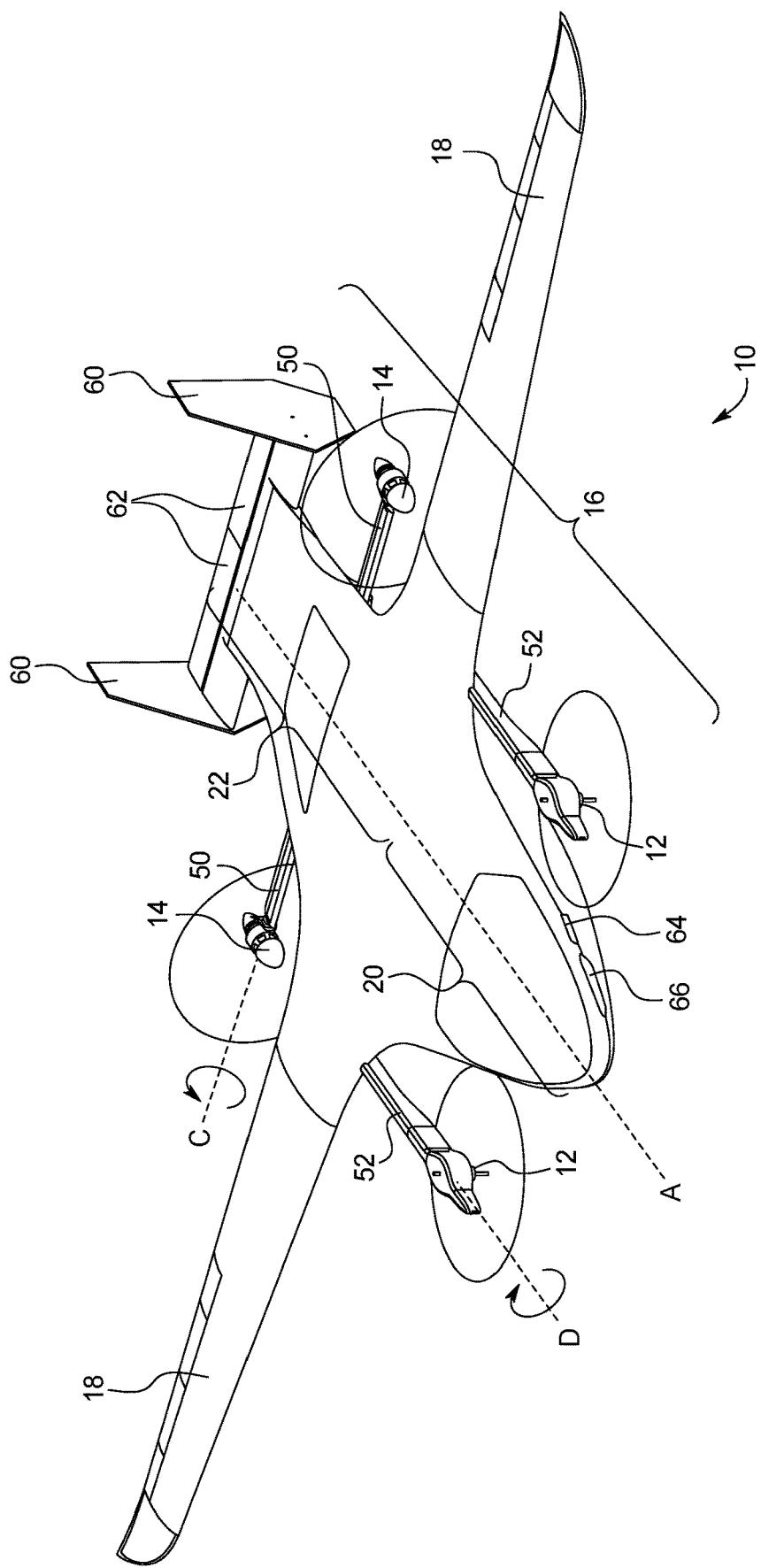

As shown in FIG. 1B, the tilting rotors 12, 14 can additionally or alternatively be attached to longitudinal booms 52 attached to the front edge and/or back edge of the wings wherein longitudinal booms 52 extend substantially parallel to the fuselage longitudinal axis A of the fuselage 16, and/or substantially perpendicular with the horizontal axis B of the wings 18. The longitudinal booms 52 can attach to the wing 18 near the fuselage 16. In an example, the longitudinal boom 52 can proximally attach to the edge of the wing at the area where the wing 18 connects to the fuselage body 16. In other words, the rotor is not connected distally on the wing 18. For example, as shown in FIGS. 3-6, the two front rotors 12 can extend from longitudinal booms 52 attached to the front edge of the wing 18, whereas the back two rotors 14 can extend from horizontal booms 50 attached to the fuselage 16. FIG. 1B illustrates an example wherein the front two rotors 12 are attached to the proximal area of the wing 18 via longitudinal booms 52 and the back two rotors 14 are attached to the fuselage body 16 via horizontal booms 50. However, another example (not illustrated) can include the front two rotors 12 attached to the proximal area of the front edge of the wing 18 via longitudinal booms 52 and the back two rotors 14 attached to the proximal area of the back edge of the wing 18 via longitudinal booms 52.

In the example where the two front rotors 12 and/or back two rotors 14 extend from longitudinal booms 52, the tilting mechanism rotates the rotatable axis 30 about a rotor longitudinal axis D, wherein rotor longitudinal axis D is parallel to the fuselage longitudinal axis A. For example, when the rotors connected to the fuselage 16 via the longitudinal booms 52, 0° refers to the rotatable axis 30 pointing downward (perpendicular to a geometric horizontal plane containing the fuselage body 16 and wings 18), 90° refers to when the rotatable axis 30 is pointed outward (away from the fuselage body; substantially parallel to the horizontal wing axis B), and 180° refers to the rotational axis 30 pointing directly upward (perpendicular to a geometric horizontal plane containing the fuselage body).

In an example, the boom connecting a tilting rotor to the fuselage 16 can be fixed, with the tilting mechanism 32 attached to the boom 50, 52. Alternatively, the boom 50, 52 can rotate, with a tilting mechanism within the fuselage 16.

Because the rotors 12, 14 are attached to booms 50, 52 and/or struts as opposed to wing tips, the main wing 18 can have a much larger wing span that otherwise possible because the wing 18 does not have to support large bending moments from rotor thrusts at the wing tips. Further, the booms 52 can extend out from the fuselage 16 in the lateral direction, as opposed to booms extending out from the wing in the longitudinal direction. By extending out from the fuselage 16, the rotors can have a tilt angle of up to 360 degrees about the horizontal axis C, as the tilt is not limited by rotor blades colliding with the boom.

The configuration shown in FIG. 1B the aircraft can achieve lateral motion without rolling of the aircraft frame during hover mode, which allows it to benefit in the lateral direction from the same advantages as in the longitudinal direction (as in the configuration in FIG. 1A). The present system enables control of the translational motion without changes in aircraft altitude, which is critical for stable hover modes of a fixed wing VTOL aircraft, especially in windy conditions. The controller enables the tilt and throttle of each rotor to achieve net thrust in the desired direction and cancel out any undesired force or moments in other directions.

Each tilt rotor 30 can include a motor attached to a base. The motor can be a brushless outrunner type DC motor. However, the system 10 is not limited to such motor and any suitable motor can be used. The motor is operable with a propeller, such as a pitch propeller, that is powered to rotate about a rotational axis located along the center of each motor. The motor is adapted to propeller that rotates about a rotational axis, wherein the rotational axis is perpendicular to a generally associated ground plane. The tilting mechanism can also include a servo motor adapted to tilt the motor and propeller away from the rotational axis. The servo motor can be attached to a holder and an output of the servo motor that is connected to the base to tilt the motor in a controlled manner.

The aircraft 10 can start in a vertical mode, wherein lift is generated by each rotor 30 that permits the aircraft to take off from the ground similar to a helicopter. Once the aircraft 10 is airborne, the rotors 30 can be rotated via the pivotable mechanism 32 to provide a horizontal thrust to move the aircraft 10 horizontally.

The system 10 can include a controller for adjusting the rotational speed and tilt of the propellers 34 for the propulsion of the aircraft and to balance the aircraft. The controller can be in communication with or include a remote pilot control through a standard drone remote control (RC) transmitter. The controller can also be in communication with a computer or tablet that can send navigation or mission commands to the aircraft, and the commands can be carried out automatically by the aircraft. The controller can include nonvolatile memory component configured to store instructions to be executed by the controller. The controller can communicate with a transceiver connected to the aircraft, wherein the transceiver enables the aircraft to be piloted by the controller remotely. Alternatively, or in addition to, the controller can control the flight of the aircraft by a computer program stored and executed by the controller. For example, a user can preprogram a specific flight pattern into a memory in communication with the controller, wherein the aircraft can automatically execute the preprogrammed flight pattern. Further, a GPS unit can be connected to the aircraft, wherein the controller can determine the global position of the aircraft based on the data received from the GPS. The system can include avionics that are designed around a central controller-area network (CAN) bus architecture.

The controller is capable of adjusting the tilt angle 40 of the tilt rotors 30 towards and away from the vertical rotational axis D. The tilting mechanism is controlled by the controller to manipulate the propeller towards and away from the vertical rotational axis D along a pivot point located at a swivel connection within the base 56.

The propellers 34 can be rotated in the same or different angular direction and can be tilted to face the same or different direction relative to the central vertical axis D. Typically, for example, the front right and rear left propellers rotate in opposite directions to the front left and rear right propellers. Optionally, each rotor 30 could be oppositely tilted relative to such configuration to achieve the direct opposite yaw moment.

In an example, the system 10 can exclude at least one vertical stabilizer 60, thereby reducing drag and minimizing the effect of crosswind on heading during hover. A vertical stabilizer 60 typically runs parallel to the longitudinal length of the fuselage. The vertical stabilizers 60 can extend for the entire longitudinal length of the fuselage 16 or for only a portion of the longitudinal length of the fuselage 16. Further, vertical stabilizers 60 can be positioned on the top surface of the fuselage 16 as well as the bottom surface of the fuselage. However, the present system does not require a vertical stabilizer because of active yaw control in all flight modes by differential thrust.

In addition, the yaw in forward flight can be controlled actively using split elevons 62 and differential thrust. The elevons 62 can be installed on each side of the back end of the aircraft 10 (e.g. on swept wings), wherein the deflection angle of each elevon 62 can be controlled by the controller.

In addition, the present system can include antennas or other devices attached to different locations based on implementation or application. Further, the system can include multiple navigation cameras 64 and/or lights 66 for collision avoidance and positioning. An ADS-B receiver for air traffic awareness can be included. As shown in FIG. 1B, the system can include a pair of navigation cameras 64 on the front of the fuselage 16, one on each side, used for collision avoidance.

Figure 4:
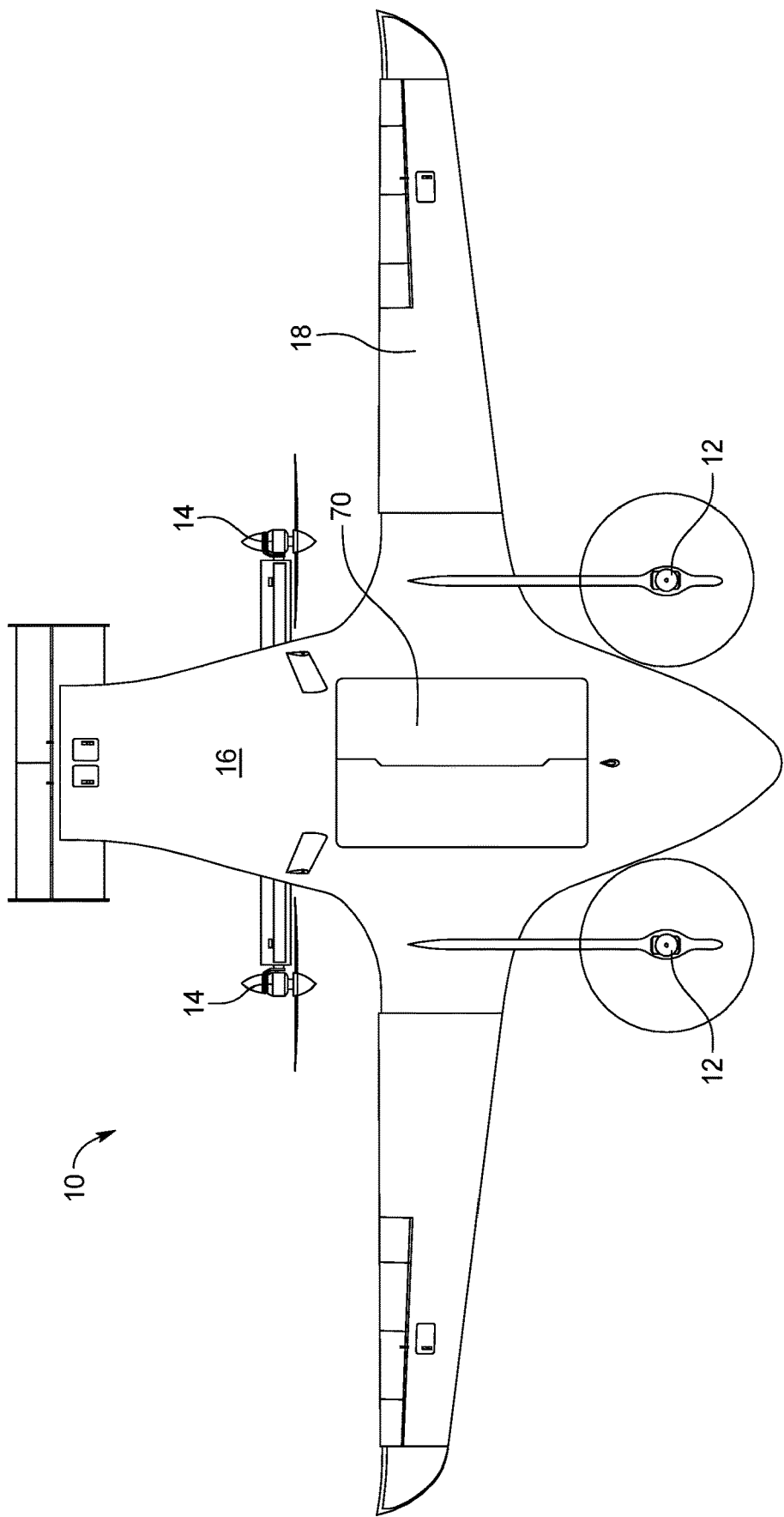
FIG. 4 is a bottom view of an example of the aircraft system.
Figure 5:
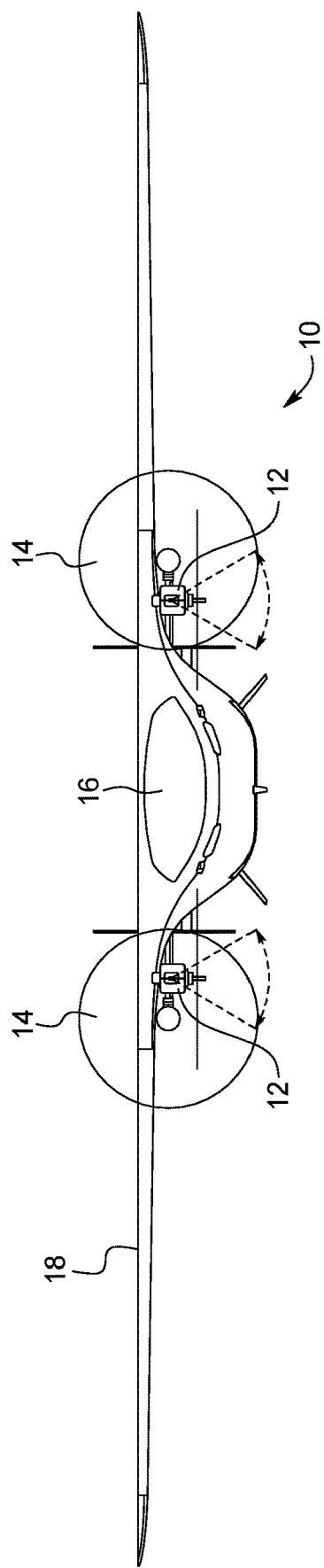
FIG. 5 is a front view of an example of the aircraft system.
Figure 6:
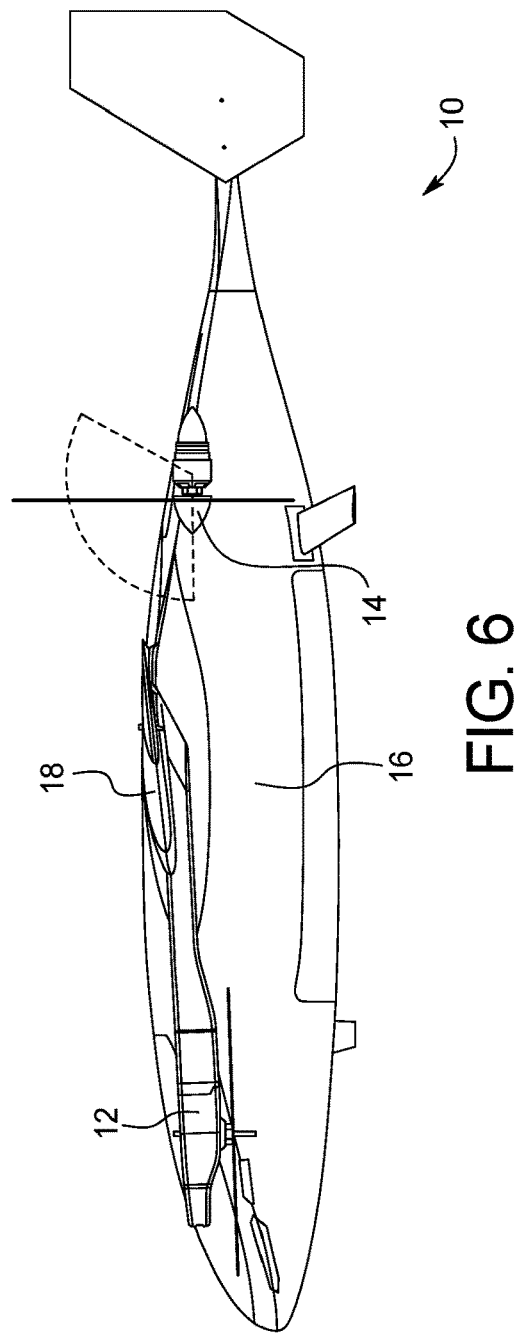
FIG. 6 is a side view of an example of the aircraft system.

Different payload or sensors (e.g. cameras) can be attached inside or exterior to the aircraft for different missions. For example, payloads can be attached to the aircraft for transportation purposes (e.g. parcel delivery). In addition, as shown in FIG. 4, the aircraft can include an inner compartment accessible from a bottom opening 70 in the fuselage body.

The aircraft can include a power source, such as a fuel source configured to provide energy to power the operation of the aircraft. The power or fuel source can be a battery, a fuel cell, a liquid fuel container with a means for converting the liquid fuel to electrical or mechanical energy, or any combinations thereof.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

We claim:

1. A system for controlling a quad tilt vertical takeoff and landing unmanned aerial vehicle comprising:

a fuselage body including a front end region, a back end region, a first side region, and a second side region, wherein a horizontal geometric plane separates a top portion of the fuselage body and a bottom portion of the fuselage body;
a first front rotor connected to the front end region and the first side region of the fuselage body;
a second front rotor connected to the front end region and the second side region of the fuselage body;
a first rear rotor connected to the back end region and the first side region of the fuselage body;
a second rear rotor connected to the back end region and the second side region of the fuselage body,
wherein each rotor is connected to a tilting mechanism, wherein each filing mechanism includes a pivotable mechanism connected to the fuselage via a horizontal boom, wherein each tilting mechanism is configured to manipulate a tilting angle of each rotor about a horizontal axis from zero degrees to 360 degrees, wherein the horizontal axis is perpendicular to a fuselage longitudinal axis, wherein the fuselage longitudinal axis extends from the front end region to the back end region of the fuselage,
wherein when the rotors are in a 0 degree tilting angle, the plane containing propellers of the rotors is coplanar with the horizontal geometric plane of the fuselage, wherein when the rotors are in a 90 degree tilting angle, the plane containing the propellers is perpendicular to the horizontal geometric plane of the fuselage, wherein when the rotors are in a 180 degree tilting angle the plane of the propellers is coplanar with the horizontal geometric plane of the fuselage; and
a controller in communication with each rotor, wherein the controller is configured to manipulate the speed of rotation of the propellers of each rotor independently, wherein the controller is configured to manipulate the tilting angle of each rotor independently.

2. The system of claim 1, wherein the propellers of the first front rotor and the second rear rotor rotate in a direction opposite than the rotation of the propellers of the second front rotor and the first rear rotor.

3. The system of claim 1, further comprising one or more fixed wings extending from the first side region and the second side region.

4. The system of claim 1, further comprising one fixed wing, wherein the surface connecting the fixed wing and fuselage are blended, wherein the wing extends perpendicular to the fuselage longitudinal axis.

5. The system of claim 1, wherein the aircraft excludes a vertical stabilizer, wherein vertical stabilizers are surfaces extending vertically from the surface of the fuselage.

6. The system of claim 1, further comprising a transceiver in communication with the controller.

7. The system of claim 1, further comprising a GPS in communication with the controller.

8. The system of claim 1, further comprising multiple navigation cameras in communication with the controller.

9. The system of claim 1, wherein the aircraft includes at least one elevon.

10. The system of claim 1, wherein the aircraft includes a fuel source configured to provide energy to power the operation of the aircraft.

11. The system of claim 1, wherein the aircraft carries a payload.

12. The system of claim 11 wherein the payload is at least one of sensors, packages, or combinations thereof.

13. A system for controlling a quad tilt vertical takeoff and landing unmanned aerial vehicle comprising:
a fuselage body including a front end region, a back end region, a first side region, and a second side region, wherein a horizontal geometric plane separates a top portion of the fuselage body and a bottom portion of the fuselage body; a first side wing extending from the first side of the fuselage body; a second side wing extending from the second side of the fuselage body; a first front rotor connected to a front edge of the first side wing via a first longitudinal boom;
a second front rotor connected to a front edge of the second side wing via a second longitudinal boom;
a first rear rotor connected to the first side region of the back end region and of the fuselage body via a first horizontal boom;
a second rear rotor connected to the second side region of the back end region and of the fuselage body via a second horizontal boom;
wherein the first front rotor and the second front rotor are connected to a tilting mechanism configured to manipulate a tilting angle of each rotor about a rotor longitudinal axis from zero degrees to 360 degrees, wherein the rotor longitudinal axis is parallel to a fuselage longitudinal axis, wherein the fuselage longitudinal axis extends from the front end region to the back end region of the fuselage;
wherein when the first front rotor and the second front rotor are in a 0 degree tilting angle the plane containing propellers of the first front rotor and the second front rotor is coplanar with the horizontal geometric plane of the fuselage, wherein when the first front rotor and the second front rotor are in a 90 degree tilting angle, the plane containing the propellers is perpendicular to the horizontal geometric plane of the fuselage, wherein when the first front rotor and the second front rotor are in a 180 degree tilting angle the plane of the propellers is coplanar with the horizontal geometric plane of the fuselage,
wherein the first rear rotor and the second rear rotor are connected to a tilting mechanism configured to manipulate a tilting angle of each rotor about a horizontal axis from zero degrees to 360 degrees, wherein the horizontal axis is perpendicular to a fuselage longitudinal axis, wherein the longitudinal axis extends from the front end region to the back end region of the fuselage,
wherein when the first rear rotor and the second rear rotor are in a 0° tilting angle the plane containing propellers of the first rear rotor and the second rear rotor is coplanar with the horizontal geometric plane of the fuselage, wherein when the first rear rotor and the second rear rotor are in a 90 degree tilting angle the plane containing the propellers is perpendicular to the horizontal geometric plane of the fuselage, wherein when the first rear rotor and the second rear rotor are in a 180 degree tilting angle the plane of the propellers is coplanar with the horizontal geometric plane of the fuselage; and
a controller in communication with each rotor, wherein the controller is configured to manipulate the speed of rotation of the propellers of each rotor independently, wherein the controller is configured to manipulate the tilting angle of each rotor independently.

14. The system of claim 13, wherein the propellers of the first front rotor and the second rear rotor rotate in a direction opposite than the rotation of the propellers of the second front rotor and the first rear rotor.

15. The system of claim 13, wherein the surface connecting the wings and fuselage is blended.

16. The system of claim 13, wherein the aircraft excludes a vertical stabilizer, wherein vertical stabilizers are surfaces extending vertically from the surface of the fuselage.

17. The system of claim 13, further comprising a transceiver in communication with the controller.

18. The system of claim 13, further comprising a GPS in communication with the controller.

19. The system of claim 13, further comprising multiple navigation cameras in communication with the controller.

20. The system of claim 13, wherein the aircraft carries a payload, wherein the payload is at least one of sensors, packages, or combinations thereof.

* * * * *